US006397132B1

(12) United States Patent
Liu

(10) Patent No.: US 6,397,132 B1
(45) Date of Patent: May 28, 2002

(54) ELECTRONIC THRONTTLE CONTROL WITH ACCIDENT RECORDAL UNIT

(75) Inventor: Ching-Po Liu, Grand Blanc, MI (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/638,486

(22) Filed: Aug. 14, 2000

Related U.S. Application Data

(60) Provisional application No. 60/156,882, filed on Sep. 30, 1999.

(51) Int. Cl.[7] .......................... G01M 15/00; B60Q 1/00

(52) U.S. Cl. ............................ 701/35; 701/36; 123/399

(58) Field of Search ............................. 701/35, 36, 70, 701/78, 1, 93; 123/399, 401

(56) References Cited

U.S. PATENT DOCUMENTS

| | | | | |
|---|---|---|---|---|
| 3,781,824 A | | 12/1973 | Caiati et al. | |
| 3,921,749 A | | 11/1975 | Kawada | |
| 3,964,016 A | | 6/1976 | Yamada et al. | |
| 4,058,796 A | * | 11/1977 | Oishi et al. | 340/52 F |
| 4,466,525 A | | 8/1984 | Spridco | |
| 4,533,962 A | | 8/1985 | Decker et al. | |
| 4,638,289 A | | 1/1987 | Zottnik | |
| 4,706,072 A | * | 11/1987 | Ikeyama | 340/576 |
| 4,970,648 A | | 11/1990 | Capots | |
| 4,992,943 A | | 2/1991 | McCracken | |
| 5,412,570 A | | 5/1995 | Gruler et al. | |
| 5,430,432 A | | 7/1995 | Camhi et al. | |
| 5,445,024 A | | 8/1995 | Riley, Jr. et al. | |
| 5,446,659 A | | 8/1995 | Yamawaki | |
| 5,452,697 A | * | 9/1995 | Sasaki et al. | 123/399 |
| 5,465,079 A | | 11/1995 | Bouchard et al. | |
| 5,581,464 A | | 12/1996 | Woll et al. | |
| 5,583,771 A | | 12/1996 | Lynch et al. | |
| 5,638,273 A | | 6/1997 | Coiner et al. | |
| 5,754,964 A | | 5/1998 | Rettig et al. | |
| 5,832,400 A | * | 11/1998 | Takahashi et al. | 701/53 |
| 5,995,898 A | * | 11/1999 | Tuttle | 701/102 |
| 6,067,488 A | | 5/2000 | Tano | |
| 6,070,115 A | | 5/2000 | Oestreicher et al. | |
| 6,076,026 A | | 6/2000 | Jambhekar et al. | |
| 6,112,152 A | * | 8/2000 | Tuttle | 701/115 |
| 6,129,025 A | * | 10/2000 | Minakami et al. | 104/88.01 |
| 6,141,611 A | | 10/2000 | Mackey et al. | |

FOREIGN PATENT DOCUMENTS

| | | | | |
|---|---|---|---|---|
| DE | 14103599 | | 8/1992 | |
| DE | 19546815 | | 6/1997 | |
| EP | 0871142 | | 10/1996 | |
| JP | 01018733 | | 1/1989 | |
| JP | 5104985 | * | 4/1993 | B60K/41/00 |
| JP | 05296097 | | 11/1993 | |
| WO | WO9710115 | | 3/1997 | |
| WO | WO9814345 | | 4/1998 | |
| WO | WO9825248 | | 6/1998 | |
| WO | WO9924285 | | 5/1999 | |
| WO | WO9938731 | | 8/1999 | |
| WO | 01/24117 | * | 4/2001 | G07C/5/08 |

OTHER PUBLICATIONS

Tom Lankard, "GM Launches "True"Crash Recorders", Oct. 1998.

Derwent Information, Apr. 15, 2001, Title– Vehicle operation monitoring method involves monitoring of electronic throttle contol and storing information with regard to pedal position and throttle position.*

* cited by examiner

*Primary Examiner*—William A. Cuchlinski, Jr.
*Assistant Examiner*—Olga Hernandez

(57) ABSTRACT

A vehicle is provided with an electronic throttle control that electronically senses and interprets an operator demand at the accelerator pedal. This signal is communicated to a throttle control which then opens or closes the throttle accordingly. Information with regard to the driver demand, the throttle position, and preferably braking and accident signals are all stored in a memory. In the case of an accident, this information can identify whether the driver was at fault for a particular accident.

11 Claims, 2 Drawing Sheets

ELECTRONIC THRONTTLE CONTROL WITH ACCIDENT RECORDAL UNIT

This Application claims priority to Provisional Patent Application No. 60/156,882 filed Sep. 30, 1999 and entitled "Vehicle Crash Flight Recorder for ETC System".

BACKGROUND OF THE INVENTION

This invention relates to the incorporation of an accident recordal unit into a vehicle incorporating an electronic throttle control.

Vehicles have historically had a throttle connected to an operator demand pedal, (also known as the accelerator pedal) through some mechanical linkage. Typically, a cable or some other linkage connects the pedal mechanically to the throttle.

More recently, electronic throttle controls have been developed wherein a sensor senses the driver demand at the pedal and opens or closes the throttle based upon that demand, and through an electronic linkage. Thus, the sensor will monitor the amount of driver demand at the pedal, and send a signal to a throttle control. The throttle control will then control the throttle. These systems are becoming more and more popular, and provide valuable benefits.

One concern with electronic throttle controls occurs in determining the cause of an accident. With the prior art, mechanically connected pedals and throttles, a failure in the connection would be easily determined. That is, if the cable is cut, etc., one can easily determine this failure after an accident. However, such a determination is more difficult with an electronic throttle control.

Various proposed systems have suggested the use of an accident recordal unit on vehicles much like those found on airplanes. However, those systems have never been developed to incorporate electronic throttle control systems, nor to utilize any particular information that may come from an electronic throttle control system.

SUMMARY OF THE INVENTION

In the disclosed embodiment of this invention, an electronic throttle control electronically links an accelerator pedal to a throttle controller. A control for the system stores information with regard to throttle position, pedal position, and preferably brake position. When an accident is identified, all of the most recent information is locked into a storage memory. When investigating the cause of an accident, by identifying the more recent throttle and pedal positions, as well as the brake position, and comparing these monitored positions to the time of the accident, one can make an identification and determination of the cause of a particular accident.

These and other features of the present invention can be best understood from the following specification and drawings, the following of which is a brief description.

DETAILED DESCRIPTION OF A PREFERRED EMBODIMENT

Figure 1:
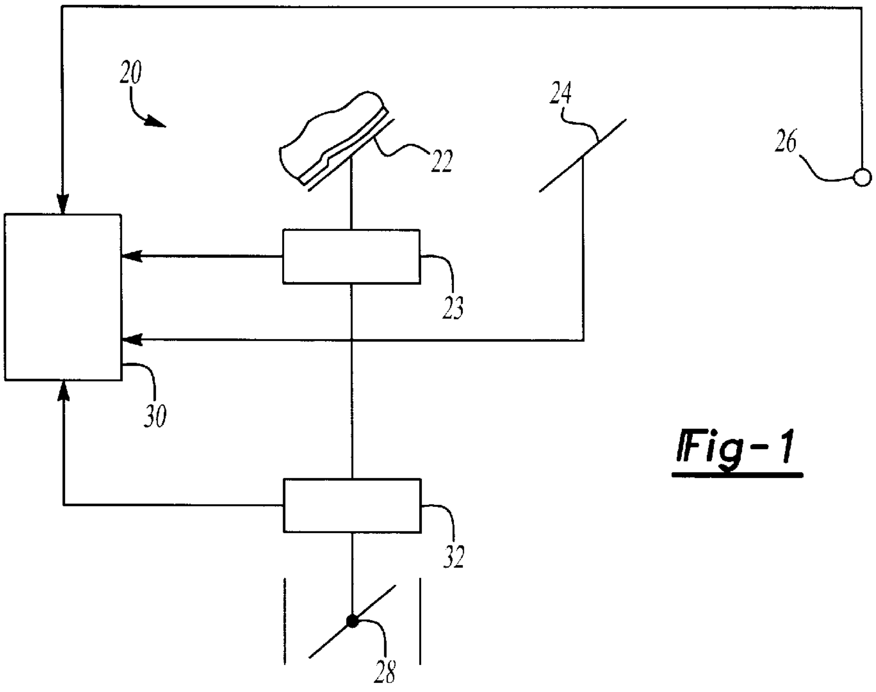
FIG. 1 schematically shows a system incorporating this invention.

A system 20 is illustrated in FIG. 1 incorporating an accelerator pedal 22 communicating with a sensor 23 for interpreting the position of the pedal 22. A brake pedal 24 is also shown schematically as well as an accident sensor 26. The accident sensor 26 may be of the type commonly utilized to trigger the ignition of an airbag system.

A throttle 28 is controlled by an electronic throttle control 32. The electronic throttle control receives signals from the sensor 23 as to the desired position for the throttle requested at the accelerator pedal 22. Elements 23, 24, 26 and 28 all communicate with a control 30. The controller 32 may communicate with the control 30 rather than the throttle 28 itself.

The control 30 stores recent information from each of the systems, and at an accident locks the most recently stored information into a hard memory. Thus, one can retrieve this information after an accident. The signal to lock the information may be actuated by the accident sensor 26. Moreover, the control 30 may continue to store the information even after the initiation of the accident.

Figure 2:
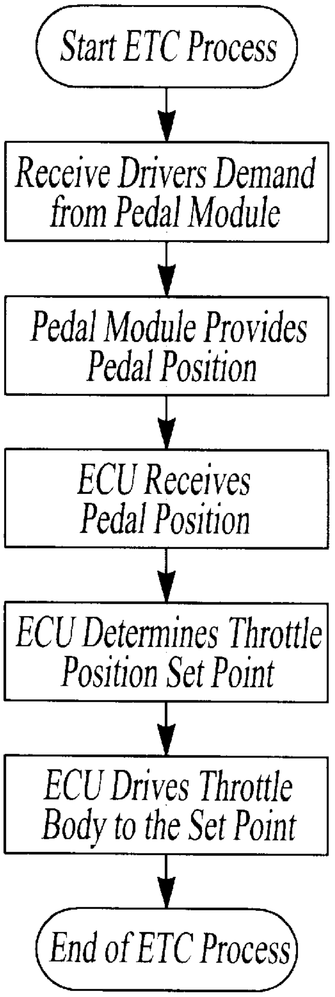
FIG. 2 is a flowchart of the electronic throttle control process.

FIG. 2 schematically shows the electronic throttle control process. A driver's demand is received from the pedal 22 through the sensor 23. A signal then goes from the sensor 23 to the controller or ECU 32. The ECU then determines a throttle position point based upon the driver demand and drives the throttle body to that set point.

Figure 3:
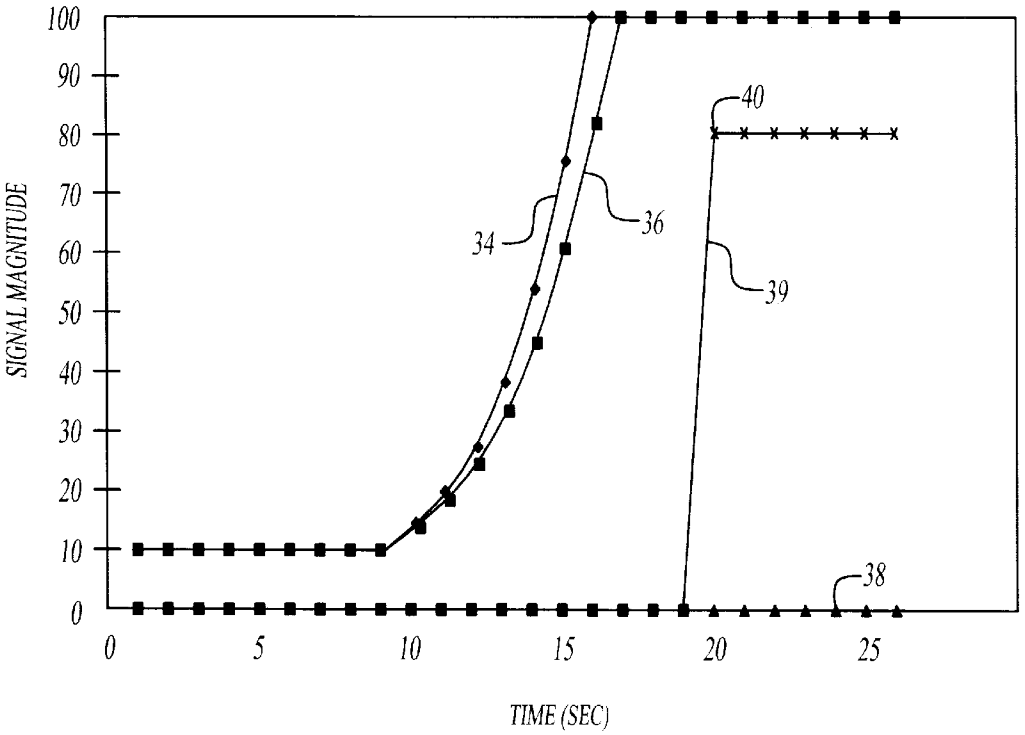
FIG. 3 is a graph of the most recent positions of the detected variables in an accident caused through driver fault.

Accidents may sometimes be due to the driver demanding an inappropriate amount of fuel, or throttle open position. As an example, FIG. 3 is a graph of the signal magnitude of several variables sensed by the control 30 at the time of a crash and over a period of time prior to and immediately after the crash. As shown, the pedal position 34 and the throttle 36 spike upwardly to a wide open throttle position. At the same time, there is no braking signal 38. The stopping force on the vehicle is shown by line 39 and spikes upwardly at the time of the crash 40. This graph shows a driver fault causing an accident. The pedal position was held wide open, and thus the throttle was held wide open up to and even after the time of the crash 40. No braking signal 38 was seen.

Figure 4:
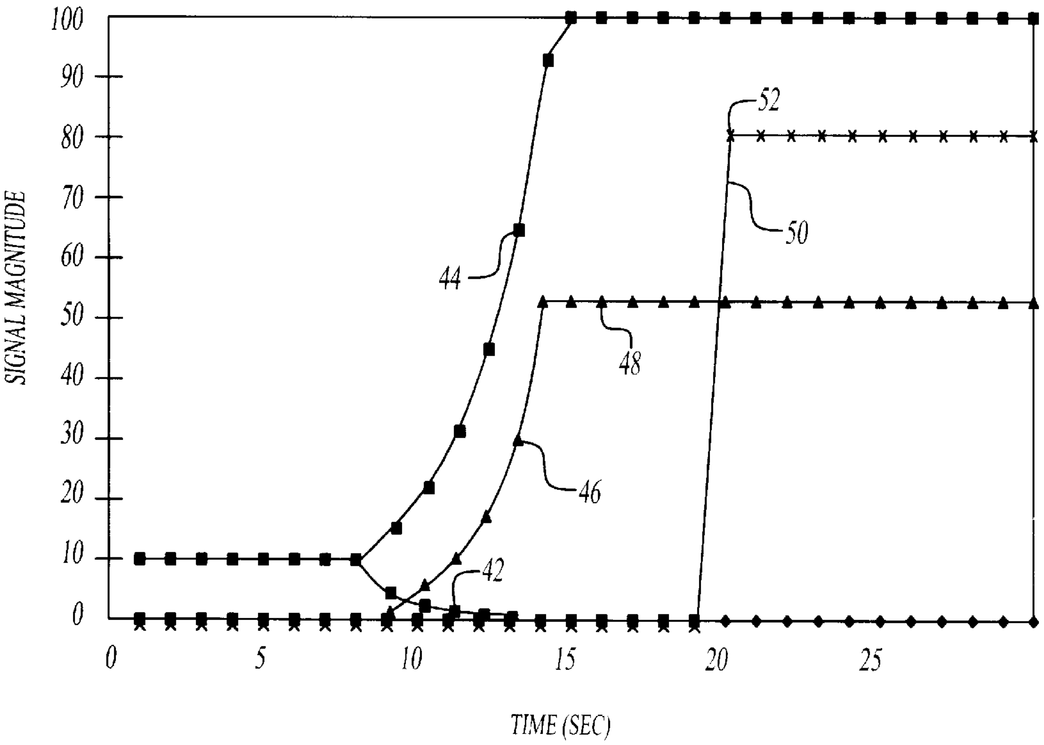
FIG. 4 shows a similar graph wherein a failed electronic throttle control caused an accident.

In contrast, FIG. 4 shows a crash event wherein the throttle pedal 42 drops to zero while the throttle itself 44 spikes upwardly. A braking signal 46 comes up concurrently to a full brake signal 48. However, the deacceleration signal 50 on the vehicle spikes upwardly at the time of a crash 52 with the wide open throttle. When investigating this crash, by comparing the pedal signal 42 to the throttle signal 44, one can determine that there may have been a fault in the electronic throttle control. The throttling was opening independent of driver demand.

The signals can be stored temporarily in a random access memory (RAM). Only a most recent period of time may be stored (i.e., the last minute, etc.). When a crash is identified, the memory will be dumped from the RAM to a non-erasable memory (i.e., EEPROM). A worker in this art would recognize that this, or many other storage options would be capable of providing the benefits and goals of this invention.

The present invention thus discloses a method of interpreting crash information for an electronic throttle control, and for providing detailed information about the cause of a particular accident.

Although a preferred embodiment of this invention has been disclosed, a worker in this art would recognize that modifications would come within the scope of this invention. For that reason, the following claims should be studied the true scope and content of this invention.

What is claimed is:

1. A method of monitoring operation of a vehicle comprising the steps of:

1) providing an electronic throttle control for communicating a signal from an accelerator pedal to a throttle electronically;

2) monitoring operation of the electronic throttle control and temporarily storing recent information with regard to pedal position and throttle position as a first type of temporary memory, and further monitoring for an accident;

3) storing information with regard to pedal position and throttle position at a time at least immediately prior to a detected accident as a permanent second type of memory; and 4) said temporary memory being a random access memory, and a signal from an accident sensor causing said most recent memory to be dumped to a non-erasable memory, which is said second type memory.

2. A method as set forth in claim 1, wherein said temporary storage occurs for said pedal position and throttle position information regardless of the magnitude of said throttle position and pedal position.

3. A method as set forth in claim 1, wherein the step of monitoring and storing information includes further storing information with regard to brake demand.

4. A method as set forth in claim 1, further including the step of detecting a crash by monitoring signals from a crash sensor and storing the most immediately recent monitored information when a crash is detected.

5. A vehicle control comprising:

a controller for receiving signals from an electronic throttle controller and an accelerator pedal, a temporary first type of memory storing the most recent of said signals, said controller communicating with a permanent second type of memory, and said second type of memory storing at least the most recent monitored information with regard to said throttle position and said pedal position when a crash is detected; and said temporary first type memory is a random access memory, and an accident signal from an accident sensor causing the information stored in said random access memory to be dumped to said second-type of memory.

6. A controller as recited in claim 5, wherein the controller further receives a brake demand signal, and brake demand signals being further stored when an accident is detected.

7. A controller as recited in claim 6, wherein said controller further communicates with an accident sensor, said accident sensor sending a signal to said controller when an accident occurs, and said controller locking the most recently monitored information when an accident is detected.

8. A controller as recited in claim 5, wherein said temporary first-type memory storing said throttle position and pedal position information regardless of the magnitude of said throttle position and pedal position.

9. An electronic throttle control system comprising:

an accelerator pedal for receiving an operator demand for fueling;

a sensor for sensing said operator demand;

said sensor communicating with an electronic throttle control for interpreting said operator demand and controlling a throttle in response to said operator demand, and a throttle control by said electronic throttle controller;

a temporary first type of memory temporarily storing information during operation of said vehicle, and an accident sensor for identifying an accident and sending a signal to a control, said accident signal causing said most recent information to move from said first type memory to a permanent second type of memory which stores information with regard to said operator demand and said throttle position after an accident; and said temporary first type memory is a random access memory, and an accident signal from an accident sensor causing the information stored in said random access memory to be dumped to said second-type of memory.

10. An electronic throttle control system as recited in claim 9, wherein said temporary first-type memory storing said throttle position and pedal position information regardless of the magnitude of said throttle position and pedal position.

11. A method of monitoring operation of a vehicle comprising the steps of:

(1) providing an electronic throttle control for communicating a signal from an accelerator pedal to a throttle electronically;

(2) monitoring operation of the electronic throttle control and storing information with regard to pedal position and throttle position, regardless of the magnitude of said pedal position and said throttle position, and further monitoring for an accident; and (3) storing information with regard to pedal position and throttle position at a time at least immediately prior to a detected accident.

* * * * *